Patented June 4, 1929.

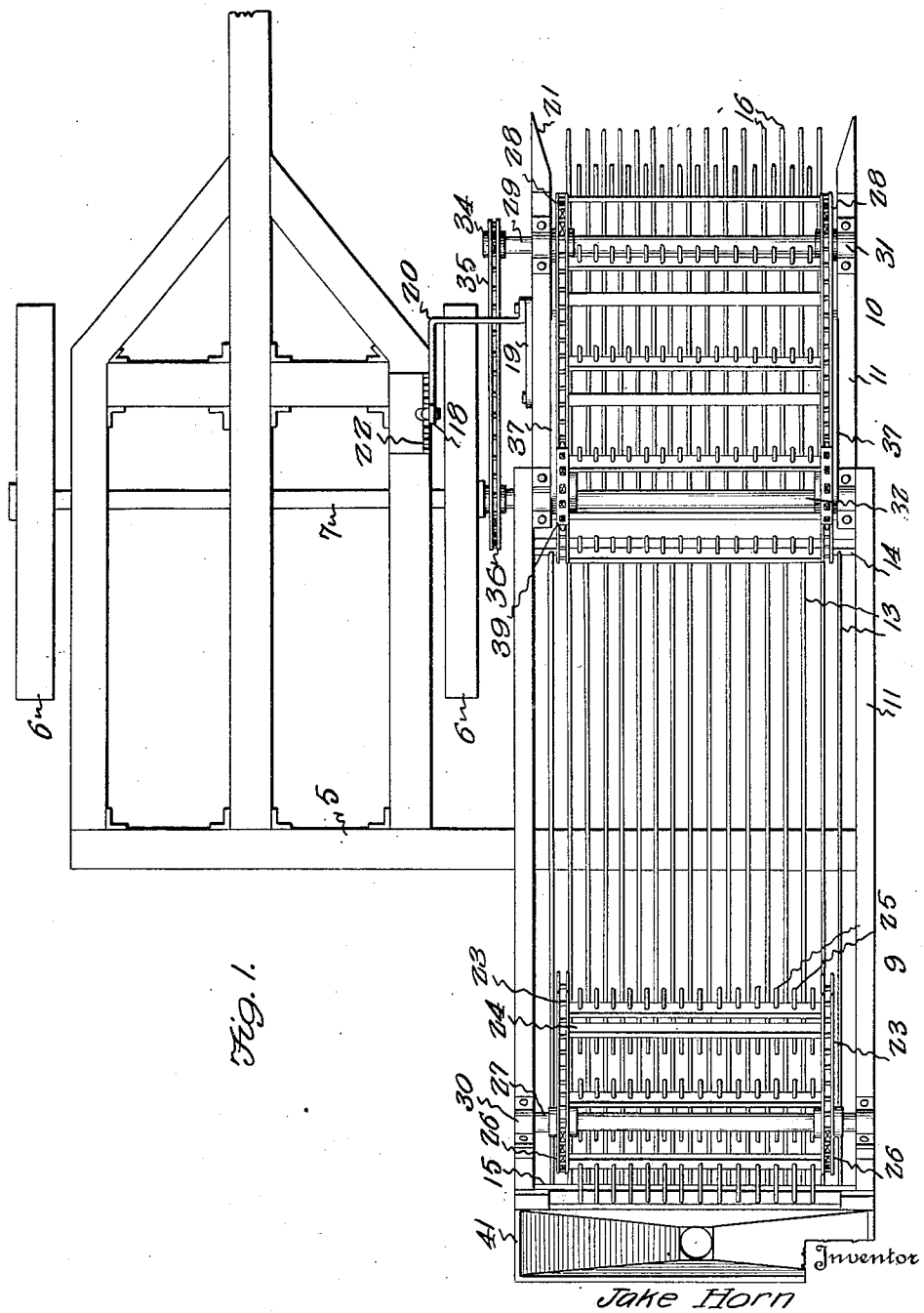

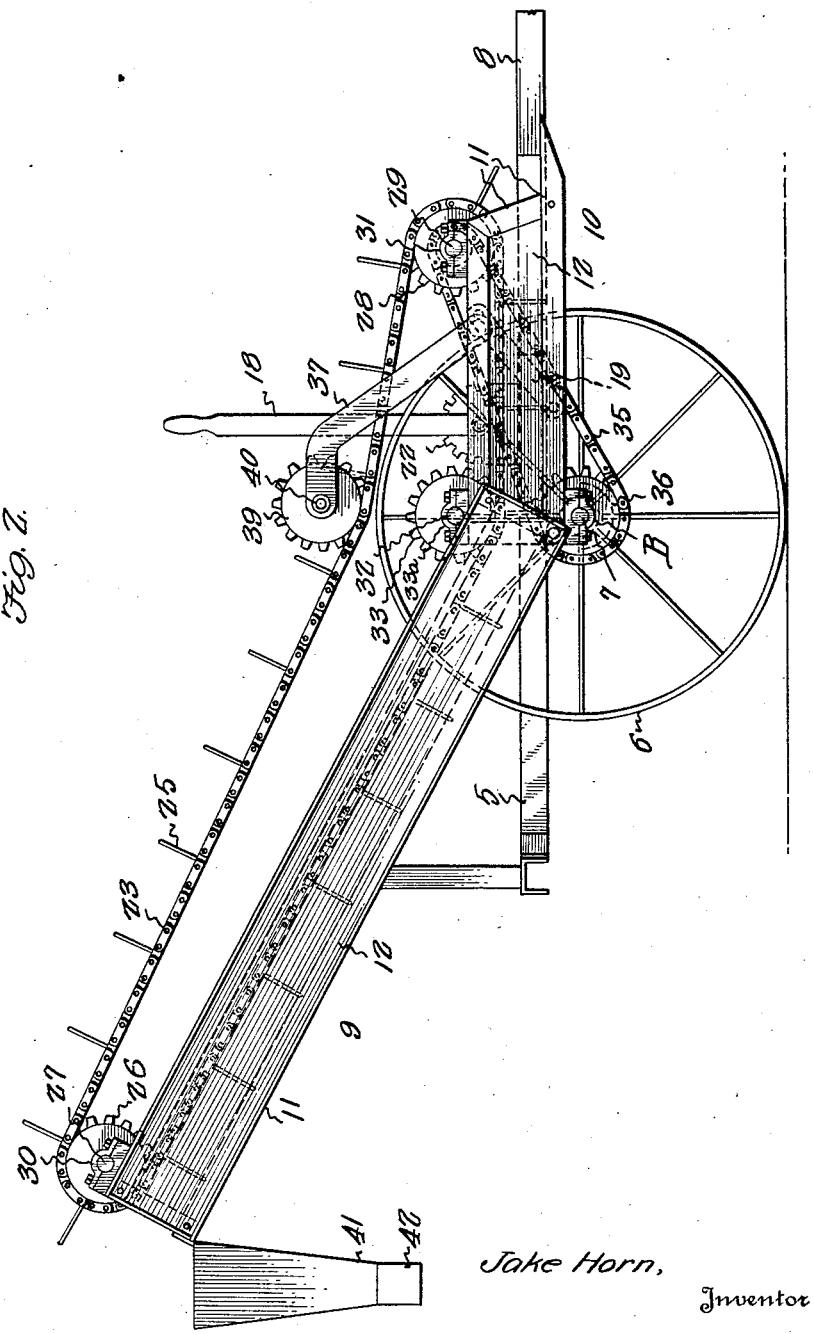

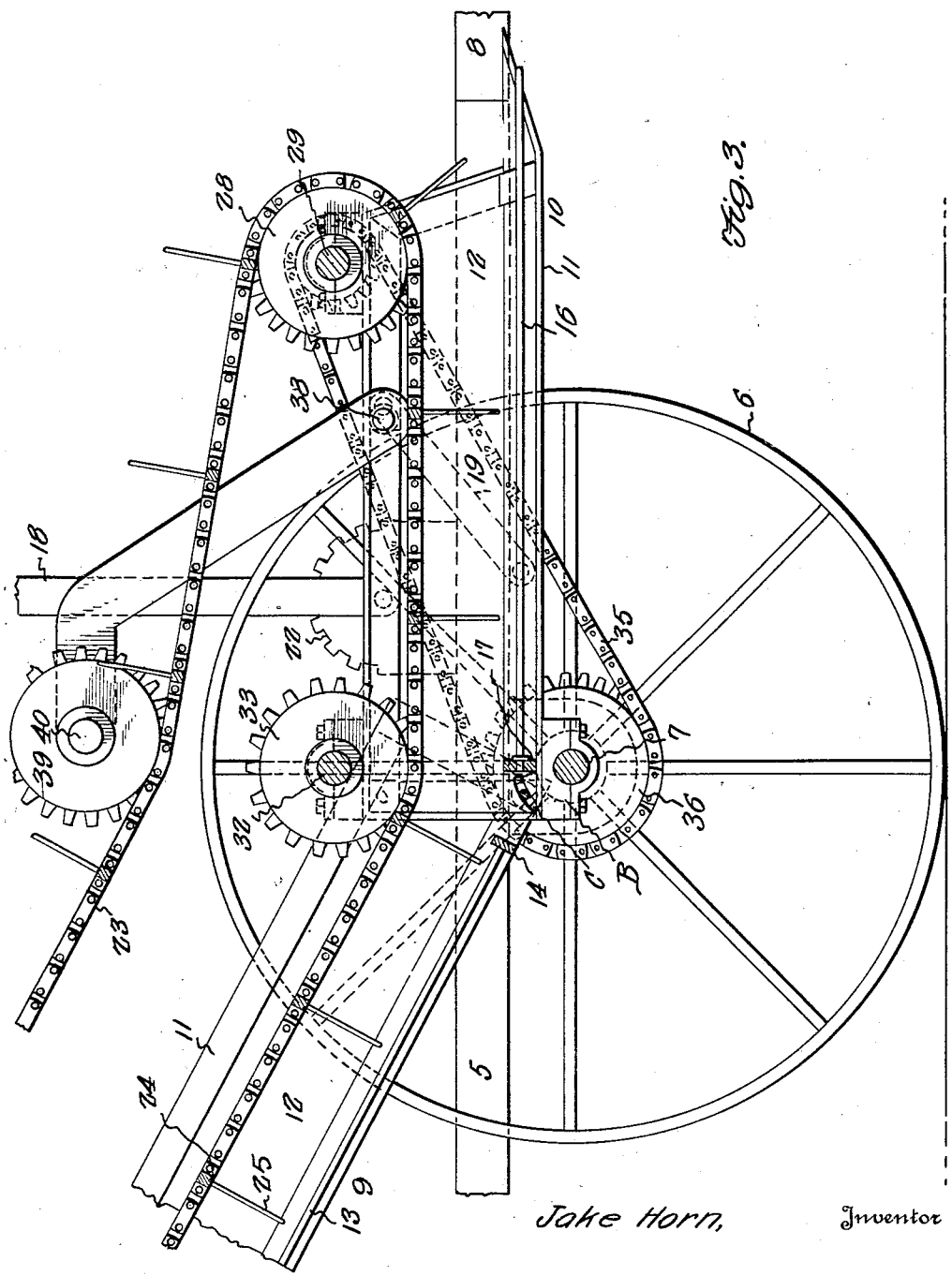

1,715,836

UNITED STATES PATENT OFFICE.

JAKE HORN, OF MINCO, OKLAHOMA.

COTTON-HARVESTING MACHINE.

Application filed April 10, 1925. Serial No. 22,142.

This invention relates to certain new and useful improvements in cotton harvesting machines, and has particular reference to a machine of this kind embodying means to strip the bolls from the cotton plants and load the same into a suitable receptacle.

The primary object of the invention is to provide a cotton boll harvesting machine of the above kind which will be extremely simple and durable in construction as well as efficient in operation so as to meet with the requirements for a successful commercial use.

Another object of the invention is to provide an improved means for stripping the bolls from cotton plants and conveying the same upwardly and rearwardly for being discharged into a suitable receptacle, which means effects separation of leaves and trash from the bolls before they are deposited into the receptacle.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a top plan view of a cotton boll harvesting machine constructed in accordance with the present invention.

Figure 2 is a side elevational view of the machine shown in Figure 1, and

Figure 3 is an enlarged fragmentary longitudinal sectional view of the device shown in Figure 1, and illustrating more clearly certain details of the invention.

Referring more in detail to the drawings, the present invention embodies a main supporting frame 5 provided with supporting wheels 6 at opposite sides thereof and suitably journaled upon the intermediate portion and an end of a transverse axle 7, the frame 5 being provided with a central forwardly projecting tongue 8 adapted to be equipped with a double tree and like devices whereby draft animals may be hitched thereto so that one animal is disposed at each side of the tongue.

Suitably rigidly supported by and at one side of the main supporting frame 5 is the cotton boll stripping or gathering and loading mechanism, proper, which embodies a longitudinally arranged conveyor, the main rear portion of which as indicated at 9 is rigidly mounted in an upwardly and rearwardly inclined position, and the forward vertically swinging remaining portion 10 of which is normally substantially horizontally disposed.

The conveyor consists of a trough composed of side walls which are suitably rigidly connected in spaced parallel relation, and each of which embodies angle iron frames 11. The frames 11 are composed of upper and lower parallel rails which are rigidly connected at their ends by end rails and the space between the rails of each frame is closed by means of a panel 12, preferably of sheet metal. The frame members are preferably disposed as shown more clearly in Figures 2 and 3 so that flanges of the frame rails of portion 9 project outwardly while flanges of the frame rails of portion 10 project inwardly, and the panels 12 are secured to these rails by soldering, welding, riveting or the like.

The bottom of the conveyor trough at the rear inclined portion 9 is formed of longitudinal spaced parallel rods 13, the forward ends of which are suitably secured to a transverse bar or strip 14 which connects the lower rails of the side frames 11 adjacent the juncture of the inclined portion 9 of the conveyor trough with the forward portion 10 thereof (see Fig. 3). The rear ends of the bars 13 are similarly secured to a transverse bar or strip 15 which connects the lower rails of the side frames 11 at the rear upper end of the conveyor, and the rods 13 are spaced apart a sufficient distance to permit ready passage of leaves and trash therebetween, while preventing passage of the cotton bolls therebetween.

The bottom of the conveyor at the forward portion 10 is composed of a plurality of longitudinal spaced parallel stripping fingers or rods 16, the rear ends of which are secured to a transverse bar 17 which is arranged directly in front of the forward transverse bar or strip 14 as shown in Fig. 3, and the forward conveyor portion 10 may be manually rocked for vertically swinging the stripping fingers 16, by the actuation of a hand lever 18 whose lower end is connected by means of a link 19 and an arm 20 with the inner lower frame rail of the conveyor portion 10. As shown clearly in Figures 1, 2 and 3 the lower frame rails of the forward portion 10 project forwardly beyond the forward end rails of said frames and have their inner sides beveled as at 21 so that the branches of the plants are effectively guided in between the sides of the conveyor trough in position for having the cotton bolls stripped therefrom by the fingers 16. The forward conveyor portion 10 is hinged at its rear end on the shaft 7 by means of bearings B, so that the fingers 16 may be raised or lowered to suit the conditions as they are met with in the use of the machine, said fingers being raised when relatively tall plants are encountered and lowered when short plants are encountered. The vertical adjustment of the forward end of the conveyor portion 10 and, consequently, the adjustment of the fingers 16 may be maintained by means of a well known locking device for hand levers such as a catch associated with the lever 18 and cooperating with a rack segment 22.

An endless conveying element is provided for conveying cotton bolls from the stripping fingers 16 to and upwardly along the screening or sifting rods 13, and this endless conveying element preferably consists of a pair of endless chains 23 which are connected at intervals by transverse slats or bars 24 to each of which are attached a plurality of outwardly projecting fingers or prongs 25, the chains 23 being each passed about one of a pair of sprocket wheels 26 secured upon a head shaft 27 and one of a further pair of sprocket wheels 28 secured upon a foot shaft 29. The head shaft 27 is mounted in suitable transversely aligned bearings 30 secured to the rear ends of the upper rails of the side frames 11, while the foot shaft 29 is similarly journaled in transversely aligned bearings 31 secured upon the forward ends of said upper rails of the side frames 11, as clearly shown in Fig. 2.

A transverse shaft 32 is suitably journaled in bearings 33 carried by the upper rails of the side frames 11 at the rear end of the forward conveyor portion 10 and mounted upon this shaft 32 are a pair of idler or guide sprocket wheels 33 under which the endless chains 23 pass. The shaft 29 projects inwardly beyond one side of the conveyor trough where it is equipped with a sprocket wheel 34 about which passes an endless sprocket chain 35 that also passes around another sprocket wheel 36 secured to the hub of the adjacent supporting wheel 6. It is thus apparent that, upon forward travel of the machine, the rotation of the inner supporting wheel 6 is transmitted to the sprocket wheels 28 so that the latter will cause traveling movement of the endless conveyor element for insuring rearward movement of the lower strand or flight thereof, whereby the fingers 25 of said conveyor will engage the cotton bolls and convey them rearwardly. The fingers 25 of the endless conveyor element are preferably disposed in vertical longitudinal planes intermediate the planes in which the sifting rods 13 and stripping fingers 16 are disposed so that interference of these parts will be prevented and movement of the bolls rearwardly made more positive without danger of forcing the bolls downwardly between said rods 13 and stripping fingers 16. A pin and slot connection C may be provided between the adjacent ends of the conveyor portions or sections 9 and 10.

A tightening device is provided for each of the chains 23 of the endless conveyor element, and each tightening device consists of an arm 37 which occupies an upwardly and rearwardly inclined position under the influence of gravity, the lower end of said arm being pivoted as at 38 to the trough of the conveyor and having an idler sprocket 39 journaled at its upper end in position to engage the adjacent chain 23. Each sprocket wheel 39 is journaled upon a separate stub-shaft 40.

The lever 18 is positioned at one side of the main supporting frame 5 so that the same may be actuated by an operator occupying a seat, not shown, mounted on the main frame 5, such position of a seat being desirable so that the operator may control the draft animals and observe the operation of the machine. It is also apparent that the use of a clutch for disconnecting the conveyor element from the driving supporting wheel 6 may be included without departing from the spirit of the invention.

At the rear end of the conveyor trough there is attached a suitable hopper 41 into which the cotton bolls are discharged, and this hopper has a bottom discharge spout 42 by means of which the bolls may be discharged properly into a suitable receptacle, such as a trailer cart or the like suitably hitched to the rear end of the machine and disposed beneath the hopper 41.

In operation, the machine is drawn forward with the supporting wheels 6 disposed at opposite sides of a row of cotton plants, and with the draft animals similarly located, so that the conveyor or harvesting machine proper is disposed to strip the cotton bolls from the cotton plants in the next adjacent row. As the machine is drawn forward the fingers 16 will pass beneath the stems and branches of the cotton plants so that these stems and branches will pass between the fingers 16 with the cotton bolls disposed above the latter. Thus, upon continued forward travel of the machine the bolls will be effectively stripped from the branches and stems of the plants because the bolls are of sufficient size as to be prevented from passing between said fingers 16. As the bolls are stripped from the plants, they are conveyed rearwardly by the fingers 25 of the endless conveyor element and caused to move upwardly along the sifting rods 13 between which trash will readily pass. The clean cotton bolls, or the cotton bolls with the leaves and the like separated therefrom, will then be discharged into the hopper 41 from which they will pass through the discharge spout 42 into the trailer cart or other suitable receptacle provided for their collection.

From the foregoing description, it is believed that the construction and operation as well as the advantages of the present invention will be readily understood and appreciated by those skilled in the art.

What I claim as new is:

1. In a cotton harvesting machine, a wheel supported axle, a conveyor unit including a trough embodying side walls and a bottom comprising a series of spaced longitudinally extending bars, means at the rear end of the conveyor unit to receive cotton bolls carried upwardly over said bars, a forward conveyor unit mounted at its rear end above said axle and angularly adjustable to elevate and lower its forward end, the said forward conveyor unit including a trough embodying side walls and a bottom consisting of a series of spaced longitudinally extending bars, corresponding bars of the two units occupying the same vertical planes, means operable to elevate and lower the forward end of the forward conveyor, an endless travelling conveyor mounted in the two units and having a stretch extending continuously over the bottoms of the rear and forward units, means for imparting travel to said conveyor to effect travel of said stretch thereof rearwardly over the bottoms of said units, and a plurality of transverse series of fingers extending from the endless conveyor in an outward direction whereby the fingers projecting downwardly from the said stretch of the endless conveyor will travel longitudinally above and between the said bars of the two units.

2. In a cotton harvesting machine, a wheel supported axle, a conveyor unit including a trough embodying side walls and a bottom comprising a series of spaced longitudinally extending bars, means at the rear end of the conveyor unit to receive cotton bolls carried upwardly over said bars, a forward conveyor unit mounted at its rear end above said axle and angularly adjustable to elevate and lower its forward end, the said forward conveyor unit including a trough embodying side walls and a bottom consisting of a series of spaced longitudinally extending bars, corresponding bars of the two units occupying the same vertical planes, means operable to elevate and lower the forward end of the forward conveyor, an endless travelling conveyor mounted in the two units and having a stretch extending continuously over the bottoms of the rear and forward units, means for imparting travel to said conveyor to effect travel of said stretch thereof rearwardly over the bottoms of said units, and a plurality of transverse series of fingers extending from the endless conveyor in an outward direction whereby the fingers projecting downwardly from the said stretch of the endless conveyor will travel longitudinally above and between the said bars of the two units, the forward ends of the bars of the forward conveyor unit being extended to provide gathering teeth for gathering the bolls from the cotton plants.

In testimony whereof I affix my signature.

JAKE HORN.